United States Patent [19]

Mazman

[11] E Re. 31,170

[45] Reissued Mar. 8, 1983

[54] VARIABLE RESISTANCE EXERCISING DEVICE

[76] Inventor: Martin S. Mazman, 945 S. Clovis Ave., Fresno, Calif. 93727

[21] Appl. No.: 139,373

[22] Filed: Apr. 21, 1980

Related U.S. Patent Documents

Reissue of:

[64] Patent No.: 3,905,599
Issued: Sep. 16, 1975
Appl. No.: 375,107
Filed: Jun. 29, 1973

[51] Int. Cl.[3] ..... A63B 21/06; A63B 21/20

[52] U.S. Cl. ..... 272/118

[58] Field of Search ..... 272/116–118, 272/130–136, DIG. 4; 308/176

[56] References Cited

U.S. PATENT DOCUMENTS

| | | | |
|---|---|---|---|
| 564,860 | 7/1896 | Wilson | 308/176 |
| 684,688 | 10/1901 | Herz | 272/117 |
| 867,511 | 10/1907 | Karns | 308/176 |
| 2,932,509 | 4/1960 | Zinkin | 272/117 |
| 2,992,048 | 7/1961 | Longhurst | 308/176 X |
| 3,306,611 | 2/1967 | Gaul | 272/81 |
| 3,612,523 | 10/1971 | Glynn | 272/118 |
| 3,638,941 | 2/1972 | Kulkens | 272/DIG. 4 X |
| 3,734,495 | 5/1973 | Nist et al. | 272/81 X |

OTHER PUBLICATIONS

Here's Power for You, David Manners, ©1972, pp. 10, 11, 104, 110 & 122.

Notice of Motion and Motion, Points and Authorities with Exhibits 1-7 of Plaintiff in Civil Action No. 79-48-68-AAH, U.S.D.C. for C.D. of Ca.

Defendents Response to Plaintiff's Motion, Statement of Genuine Issues, Mazman Affidavit in Civil Action 79-4868-AAH, U.S.D.C. for C.D. of Ca.

Plaintiff's Reply with Exhibits 1-7, Civil Action No. 79-4868-AAH, U.S.D.C. for C.D. of Ca.

*Primary Examiner*—Paul E. Shapiro

*Attorney, Agent, or Firm*—Townsend & Townsend

[57] ABSTRACT

Disclosed is an exercising device in which stacked weights are manipulated by the user through a lever arm. A selected quantity of weights is raised and lowered on vertical guide rods by a lift rod. The lever arm is pivoted to the frame of the device and passes through a yoke in the upper end of the lift rod. A roller mounted in the yoke is carried on the upper surface of the lever arm. The lever arm is substantially horizontal when the device is at rest and as the lever arm is raised, the roller on the lift rod moves on the lever arm to reduce the user's mechanical advantage and increase his effective load. Also, as the lever arm is raised through its pivotal arc, a vectoring of the lifting force occurs, varying the portion of that force which is devoted to lifting of the weights, and thereby further increasing the effective load on the user. Further variations in resistance are possible by contouring the upper surface of the lever arm or the roller.

21 Claims, 10 Drawing Figures

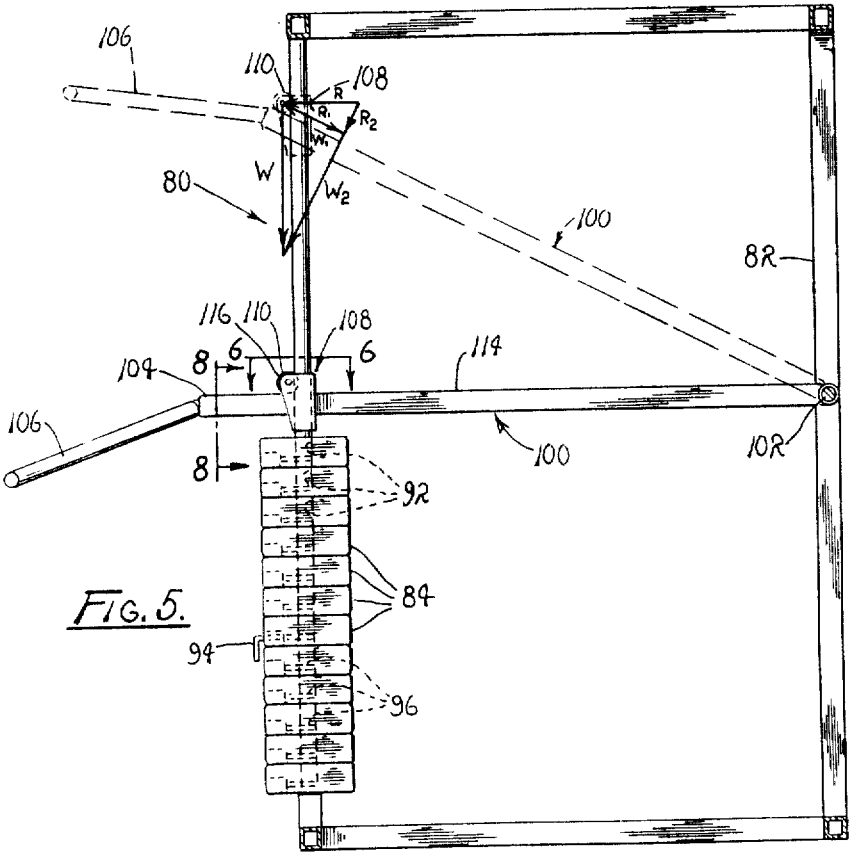
FIG. 5.
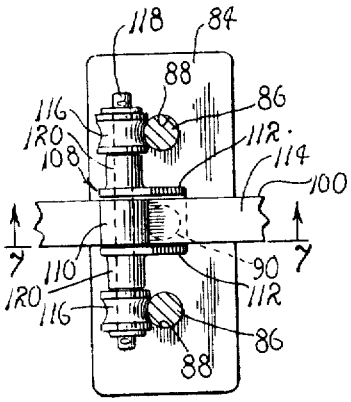
FIG. 6.
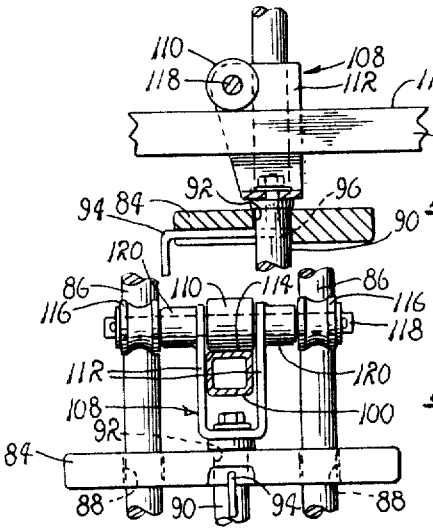
FIG. 7.
FIG. 8.

VARIABLE RESISTANCE EXERCISING DEVICE

Matter enclosed in heavy brackets [ ] appears in the original patent but forms no part of this reissue specification; matter printed in italics indicates the additions made by reissue.

BACKGROUND OF INVENTION

This invention relates generally to exercise devices and more particularly to devices which provide a variable amount of resistance to the user during an exercise movement.

According to current concepts, muscle development is best achieved by exercises which are carried out in such a manner that the muscles are continuously worked at a level of nearly maximum effort during the exercise.

Most currently known exercise devices are not capable of providing this type of exercise because the resistance which they exert remains constant or decreases throughout the exercise movement while the strength exertable by the user's muscles varies at different points in the movement, and generally increases where the machine resistance decreases. Therefore, a degree of resistance which, at one point in an exercise movement may require near maximum effort to overcome, will at some other point in the movement be either too much or too little.

It has, therefore, been a desire of both exercisers and coaches to have an exercise device which can vary the applied resistance during an exercise movement to correspond with variations in available muscle strength. Attempts have been made to satisfy this desire, however, the resultant devices have been excessively complex and expensive.

It is, therefore, a major object of my invention to provide an exercise device in which the resistance varies as the user moves the device through the exercise cycle.

It is also an object of my invention to provide an exercise device of the type described in which the manner of variation of the resistance during the exercise cycle is adjustable.

It is another object of my invention to provide an exercise device of the type described in which the variation of resistance occurs because of changes in the length of a lever arm through which the resistance is applied.

It is a further object of my invention to provide an exercise device of the type described in which the resistance is varied by the vectoring of the force applied to the machine by the user during the exercise cycle.

Still another object of my invention is to provide an exercise device structured to readily withstand heavy forces and extensive use.

Still a further object of my invention is to provide an exercise device of the type described in which the resistance varying mechanism can be incorporated into many types of existing exercise devices without substantially increasing their cost.

Yet another object of my invention is to provide an exercise device of the type described which is relatively inexpensive to manufacture, simple to use and substantially maintenance free.

DESCRIPTION OF DRAWINGS

These and other objects and advantages of my invention will become more readily apparent from the following detailed description of a preferred embodiment and the accompanying drawings in which:

FIG. 5 is an elevational section view of a second preferred embodiment of my invention;

FIG. 6 is a partial sectional view taken at 6—6 in FIG. 5;

FIG. 7 is a sectional view taken at 7—7 in FIG. 6;

FIG. 8 is a partial sectional view taken at 8—8 in FIG. 5.

DETAILED DESCRIPTION OF PARTS

Figure 1:
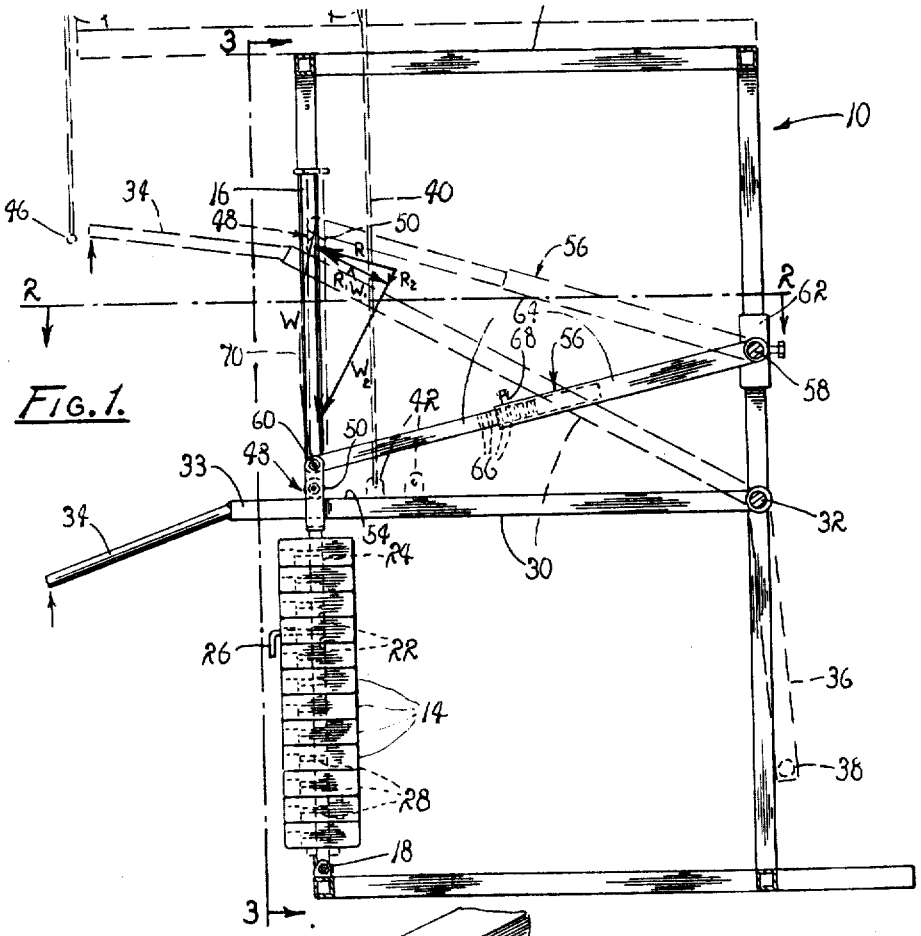
FIG. 1 is an elevational section view of a first preferred embodiment of my invention with movement in the exercise cycle shown in phantom.

Referring now to the drawings, and particularly FIGS. 1 through 4 thereof, my muscle building exercise device 10 has a floor mounted upstanding frame 12. The frame 12 contains a stack of weights 14 mounted on a pair of guide rods 16. The guide rods 16 are pivotally attached to the lower portion of the frame by pivot connections 18 so that as the weights are lifted the guide rods 16 can pivot inwardly or outwardly of the frame on either side of true vertical to adjust to the path of the weights. The weights 14 have bushed guide holes 20 which travel on the guide rods 16. The weights 14 also have centerholes 22 through which a weight lift rod 24 passes. The number of weights to be lifted are selected by inserting a selector pin 26 through pin holes 28 in the weight lift rod 24 below the bottom weight of the stack selected.

A lever arm 30 is pivotally mounted in the frame 12 on the side opposite the weights 14 by a mounting shaft 32. The lever arm 30 has a handle portion 33 which extends through the frame 12 above the weights 14 and outwardly beyond the frame on the side where the weights are located. Handle bars 34 are provided on its distai end.

The lever arm 30 also has a foot portion 36 connected to the handle portion 33 at the mounting shaft 32 and extending downward and outward from the mounting shaft on the same side of said frame 12 at an obtuse angle to the handle portion. At its distal end the foot portion 36 has a pedal plate 38 disposed for contact by a user's feet.

Still other means for moving the lever arm 30 are provided by a pull cable 40 attached to the handle portion 33 by a selected one of a pair of the ears 42. The cable 40 extends upwardly in the frame 12, over a pair of sheaves 44 on the top of the frame, and down to a pull handle 46.

Figure 4:
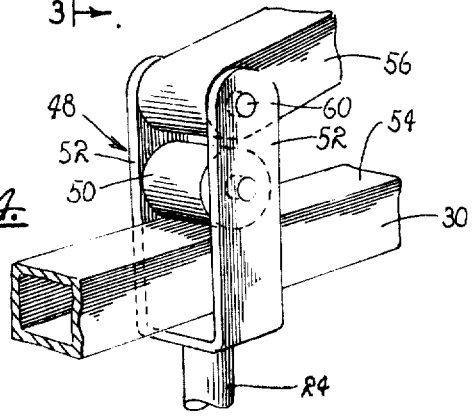
FIG. 4 is an enlarged perspective view of the movable connection which changes the lever advantage during the exercise cycle.
Figure 2:
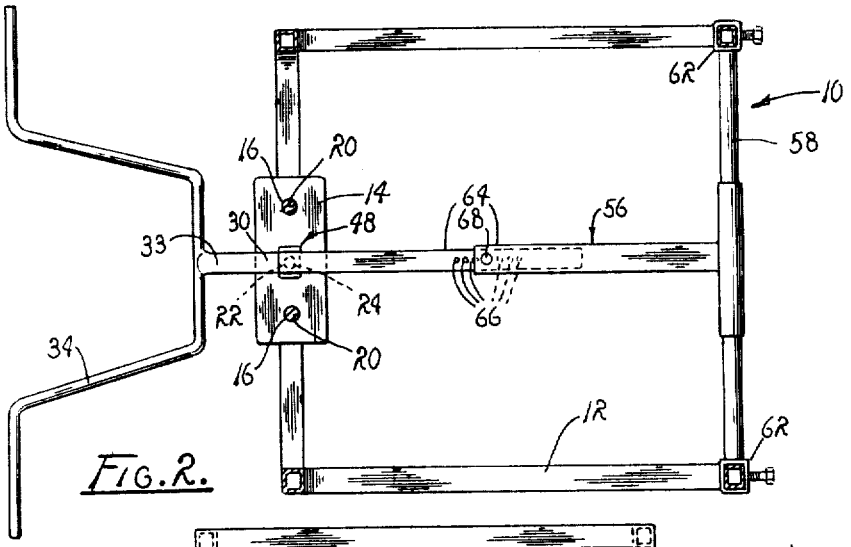
FIG. 2 is a sectional view taken on 2—2 in FIG. 1.
Figure 3:
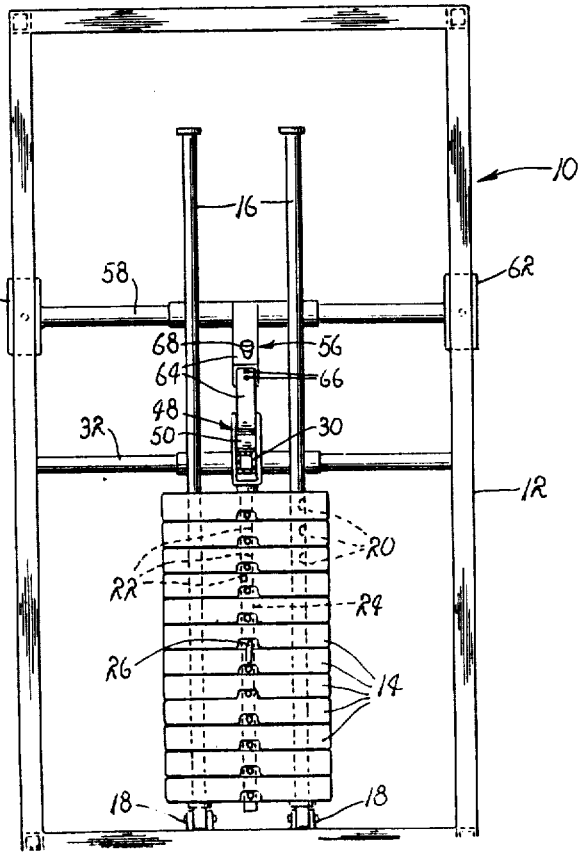
FIG. 3 is a front elevational view of the preferred embodiment of FIG. 1.

To attach the weight lift rod 24 to the lever arm 30, a yoke 48 is secured to the top of the lift rod and extends upwardly on either side of the lever arm (see FIG. 4). A roller 50 is mounted between the legs 52 of the yoke 48 and disposed to travel longitudinally along the upper surface 54 of the lever arm 30. The pivotal mounting of the lever arm 30 is so located that the upper surface 54 is disposed in a generally horizontal position when the lifting pressure is first applied to the weight lift rod 24 through the yoke 48. As the user forces the handle bars 34 upward the lever arm 30 pivots about the mounting shaft 32 on the opposite side of the frame 12 and the upper surface 54 becomes inclined toward the pivot point. As this inclining of the upper surface 54 occurs, the roller 50 on the upper end of the weight lift bar 24 tends to move toward the pivot point and pivot the guide rods 16 inwardly in the frame 12.

To control the position of the guide rods 16 and the upper end of the weight lift rod 24, a guide arm 56 is connected between the yoke 48 and the opposite side of frame 12. The guide arm 56 has one end pivotally mounted on a guide arm shaft 58 in the frame 12 and the other end pivotally mounted between the legs 52 of the yoke 48 by mounting pin 60.

The guide arm shaft 58 is mounted on the same side of frame 12 as the lever arm mounting shaft 32, by movable mountings 62. These movable mountings 62 are adjustable to vary the distance between the guide arm shaft 58 and the mounting shaft 32 which pivotally mounts the lever arm 30. Also, the guide arm 56 is formed of two telescopically connected sections 64 which are releasably secured by adjustment holes 66 and an adjustment pin 68. By these means, the guide arm 56 is made adjustable in length and point of pivoting.

Since the guide arm 56 controls the position of the upper end of the weight lift rod 24, it will be understood that with the guide arm shaft 58 positioned as shown in FIG. 1 and the guide arm 56 adjusted at the length shown in FIG. 1, raising the handle portion 33 of lever arm 30 will cause the upper end of the weight lift rod 24 to follow an arcuate path as shown by dotted line 70. During this travel, the roller 50 will move outwardly on the upper surface 54 of the lever arm 30 away from the mounting shaft 32 thereby reducing the mechanical advantage available to the user at the handle bars 34 in lifting the weights 14. The guide rods will first pivot outwardly and then inwardly in the frame 12 about the pivot connections 18 to adjust to the path of the weights.

Since the lever arm 30 and the guide arm 56 in the arrangement of FIG. 1 are so interrelated that they serve as opposite legs of a parellogram as the lever arm 30 passes through its lifting movement, it will be understood that the distance which the roller 50 will travel outward on the upper surface 54 of the lever arm 30 at any particular point in the movement, and the rate of that travel, will be determined by the distance between the mounting shaft 32 and the guide arm shaft 58, and the length of the guide arm 56. Since these factors can be varied by changing the length of guide arm 56 using adjustment holes 66 and adjustment pin 68, and by changing the distance between the guide arm shaft 68 and mounting shaft 32 by using the movable mountings 62, the location and rate of change of the variations in resistance experienced by the user at particular points in the exercise movement are adjustable. Furthermore, adjustment of the length and pivot point of the guide arm 56 will change the manner in which the force vectoring occurs, thereby modifying the resistance variations brought about by the lever arm changes.

The change in mechanical advantage is brought about, of course, by movement of the roller 50 during the exercise movement outwardly along the upper surface 54 of the lever arm 30 to positions more distant from the pivot point of the lever arm at the mounting shaft 32 than the position in which the roller 50 was located when the exercise cycle began, and is further affected by the force vectoring.

In FIG. 1 I have illustrated the vectoring of forces which occur during the exercise movement. The letter W represents the weight vector which resolves itself, at the position shown in phantom, into axial weight vector $W_1$, directed toward the pivot point of lever arm 30, and moment weight vector $W_2$, directed against the pivotal movement urged by the user. Since the guide arm 56 resists the force of axial weight vector $W_1$ and prevents movement of the roller 52 toward the mounting shaft 32, it must supply an equal and opposite resistance vector $R_1$. Since the guide arm 56 can only apply resistance force axially along the guide arm, however, the $R_1$ vector must be derived from a guide arm resistance force vector R. This results in a moment resistance vector $R_2$ being applied by the guide arm 56 which combines with the moment weight vector $W_2$ to increase the resultant moment resistance applied against the pivotal movement urged by the user. Since the moment weight vector $W_2$ is reduced as the lever arm 30 is pivoted upwardly, this must be overcome by changes in the lever arm and an increase of the $R_2$ moment resistance vector in order for the user to meet with an increasing effective resistance during the upward movement of the lever arm. At the point shown in phantom in FIG. 1 it will be seen that the addition of the weight moment vector $W_2$ and the resistance moment vector $R_2$ still do not equal the main weight vector W. The lever arm increase more than compensates for this reduction of the effective moment force, however, so the user experiences more resistance at this point than at the staring point of the exercise where the lever arm 30 is substantially horizontal. At other points in the exercise movement the addition of the $W_2$ and $R_2$ vectors will exceed the main weight vector W and will, therefore, combine with the lever arm change to further increase the resistance experienced by the user. The reduction in the $W_2$ vector during the exercise movement illustrates the fault in presently known exercise devices which use a pivoted lever arm similar to this embodiment. As the lever arm moves closer to vertical more and more of the weight is supported by the pivot and the effective resistance to the user is reduced. Generally this occurs where the user's muscle strength is increasing, so full muscle development is not achieved. My device overcomes this disadvantage, as explained.

It will also be understood that the same effect with respect to variation of the user's mechanical advantage and vectoring of the resultant forces will be achieved by moving the lever arm 30 by means of the foot portion 36 through foot pedal plate 38 or by the cable 40 through handle 46.

OPERATION OF FIRST EMBODIMENT

Having described the structural details of the first preferred embodiment of my exercising device, I will now describe its operation.

The operation will be explained in conjunction with the practice of exercises typically used in machines of this type. One such exercise is a bench press. In this technique the exerciser lies on his back on a bench with his head toward the exercising device and grips the handle bars 34 with his hands. The height of the bench is such that his arms are well retracted with his hands located near his chest when the exercise is started. Starting with the handle bars 34 just above him the user then extends his arms and presses the handle bars 34 upward until his arms reach their fully extended position above him. Then he slowly retracts his arms again lowering the handle bars 34 to their original position.

The user will normally select, for this exercise, the maximum weight which he is able to lift when his arms are in retracted position. Having selected these weights by placing the pin 26 in the proper hole 28 of the weight lift rod 24, the user then presses upwardly on the handle bars 34. As the handle bar 34 is forced upward, the weights 14 are carried upward by the weight lift rod 24 because of the engagement of the roller 50 with the upper surface 54 of the lever arm 30.

The more the lever arm 30 is driven up, the further roller 50 is moved away from the mounting shaft 32 about which the lever arm 30 pivots. This, of course, moves the lifting point of the weights closer to the handle bars 34 as the lever arm 30 is forced upwardly, and the user is thus subjected to a decreasing mechanical advantage and a greater resistance from the same amount of weight. When the user lowers the handle bars 34, the opposite movement of roller 50 occurs and the strength required to support the weight stack as the arms are retracted becomes less.

At the same time the vectoring of the weight force W into a reducing $W_2$ weight moment vector is at least partially overcome, and at some points is more than overcome, by the movement resistance vector $R_2$, thus further enhancing the increase in resistance experienced by the user. Since neither the lever arm change nor the force vectoring change in this embodiment is linear, the resistance changes experienced by the user are non-linear during the exercise movement, and as explained, will vary depending on the guide arm pivot location and length.

It will be understood by those skilled in the art that the variation of resistance during the exercise movement of this exercise does not exactly correspond with the available muscle strength of the user at various points in the movement. A closer correspondence may be achieved, however, by contour adaptions to the upper surface 54 of the lever arm 30 or the periphery of the roller 50, as will be explained later.

SECOND EMBODIMENT

In FIGS. 5 through 8 I show a modified form of my invention represented generally by the numeral 80. The modified form has a frame 82 substantially identical to the frame 12 in my first embodiment which carries weight 84 on one side. The weights 84 are mounted on guide rods 86 in the same manner as in my first embodiment except that in this embodiment the guide rods are not pivotally mounted to the frame but are rigidly affixed thereto at top and bottom. The weights 84 have bushed guide holes 88 which travel on the guide rods 86, in the same manner as in my first embodiment. The weights 84 are engaged and lifted by a weight lift rod 90 which passes through center holes 92 in the center of the weights in the same manner as in my first embodiment, and the number of weights selected is regulated by inserting a pin 94 into pin holes 96 in the weight lift rod.

The second embodiment of my invention also has a lever arm 100 pivotally mounted in the frame 82 on a mounting shaft 102 disposed on the opposite side of the frame from the weights 84. The lever arm 100 has a handle portion 104 which extends across the frame from the mounting shaft 102, over the weights 84 and outside the frame 12, and has handle bars 106 mounted on its distal end. A yoke 108 is attached to the upper end of the weight lift rod 90 and extends upward about each side of the lever arm 100. A main roller 110 is mounted between the upstanding legs 112 of the yoke 108 and disposed to roll on the upper surface 114 of the lever arm.

In this second embodiment, moving the lever arm 100 upwardly about its pivot point at the mounting shaft 102 by applying upward pressure to the handle will not only carry the weights 84 up the guide rods 86 but will force them against the rods as the lever arm moves through its arcuate path. The weights 84 are forced against the guide rods by reason of the tendency of the main roller 110 to travel toward the mounting shaft 102 on the upper surface 114 of the lever arm 100 when the lever arm is raised to incline the upper surface toward the mounting shaft. To prevent excessive wear on the guide rods 86 and the guide holes 88 of the weights 84, a pair of alignment rollers 116 is provided on the yoke 108 on each side of the main roller 110. The alignment rollers 116 travel on the guide rods 86 and hold the weight lift rod 90 in vertical alignment with the guide rods. This action of the alignment rollers 116 holds the stack of weights centered on the guide rods 86 and prevents excessive wear on one side of the bushed guide holes 88.

To accommodate the main roller 110 and the alignment rollers 116, the legs 112 of yoke 108 extend outwardly from the guide rods 86 and mount a roller shaft 118 therebetween which carries the rollers. Spacers 120 are provided between the legs 112 and the alignment rollers 116 to hold the alignment rollers in alignment with the guide rods 86.

In this second embodiment, as in the first, the main roller 110 is caused to move outward on the upper surface 114 of the lever arm 100 as the handle portion 104 is raised by the handle bars 106 in the exercise movement. This movement of the main roller 110 reduces the mechanical advantage to the user, in the same manner as in my first embodiment, however, the amount and rate of change will not be the same as in my first embodiment.

Vectoring of the forces will occur in this embodiment, in a manner generally similar to that described in my first embodiment, and this vectoring is indicated by the vector diagram in FIG. 5. Again, W is the weight resistance vector which resolves itself into an axial weight vector $W_1$, and a moment weight vector $W_2$. Movement toward the pivot point by the roller 110 is prevented by vector $R_1$, which results from the vectoring of the main resistance vector R applied by the guide rods 86 through the alignment rollers 116. When the main resistance vector R divides to provide the axial resistance vector $R_1$ equal and opposite to weight axial vector W, a resistance moment vector $R_2$ results. Moment vectors $W_2$ and $R_2$ combine into a moment resistance which resists the pivotal movement being urged by the user.

OPERATION OF SECOND EMBODIMENT

The operation of my second preferred embodiment is substantially the same as for my first embodiment, except that the proportionate change of mechanical advantage as the lever arm 100 moves through its cycle is somewhat different. This is due to the direct vertical path of travel of the yoke 108 along the guide rods 86. My second embodiment, of course, does not provide means for changing the lever advantage conditions as in my first embodiment where this is accomplished by the adjustable length and pivot point of the guide arm 64.

In this embodiment, as the handle bars 106 are raised, the weight lift rod 90 is raised by engagement with the main roller 110 on the upper surface 114 of the lever arm 100. Since the alignment rollers 116 travel upward on the guide rods 86, the main roller 110 is drawn outwardly along the upper surface 114 as the lever arm 110 continues to move upwardly. This, together with the vectoring described, reduces the mechanical advantage to the user, and requires him to exert more force to lift the same weight. When the handle bars 106 are lowered again the main roller 110 moves inward on the lever arm 100, returning the lost mechanical advantage to the user.

PROGRAMMED RESISTANCE MODIFICATIONS

From this description of the structure and operation of preferred embodiment it will be understood that my exercise device can readily fulfill the desire for a machine with a resistance which varies during the exercise movement.

I will now describe further modifications of my invention which can be utilized to more closely match the resistance at any point in the exercise movement to the user's potential muscle strength at that point.

Actually, in performing a bench press, for example, the user's potential muscle strength is relatively high at the beginning of the exercise movement where his arms are fully retracted and highest at the end of the movement as his arms reach full extension. About midway through the exercise movement, however, there is a weak point in muscle strength potential. This occurs about the position where the upper and lower arm form a right angle at the elbow. In weight lifting exercises this point is sometimes referred to as a sticky spot.

Figure 9:
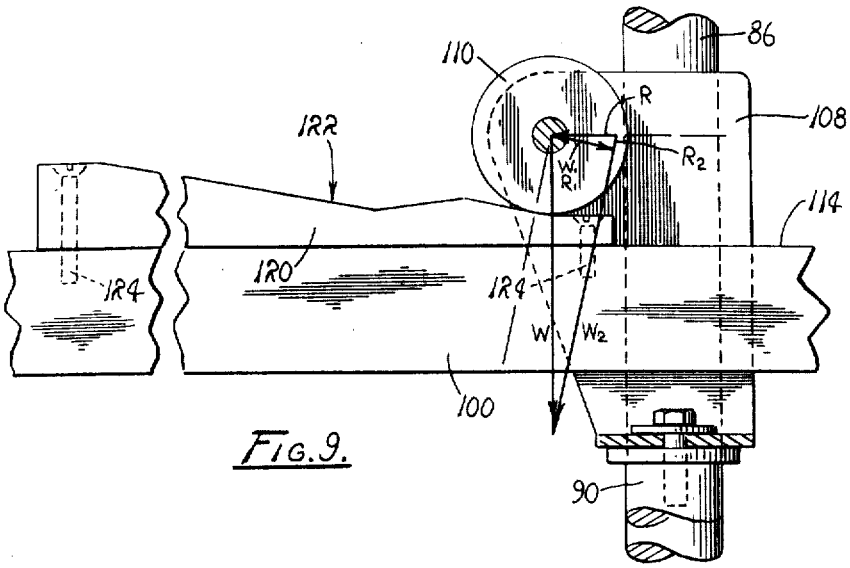
FIG. 9 is an enlarged partial side elevational view of my second preferred embodiment showing the first form of a modification for programmed resistance.
Figure 10:
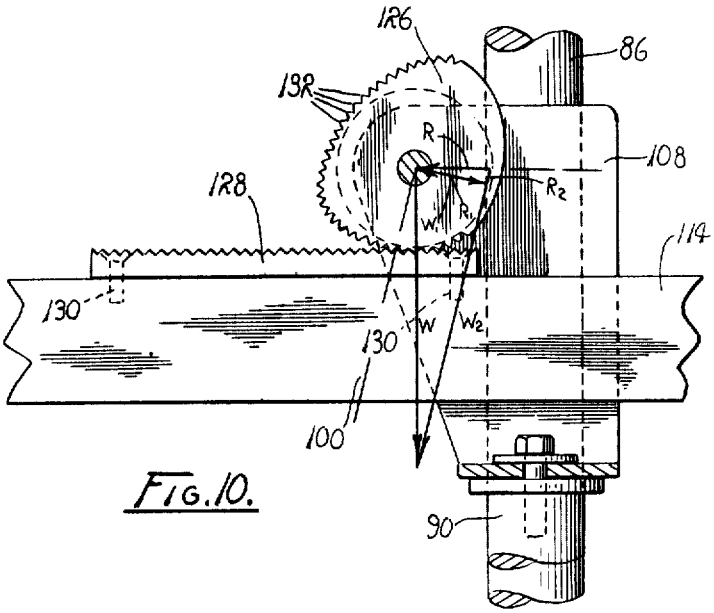
FIG. 10 is an enlarged partial side elevational view of my second preferred embodiment showing a second form of a modification for programmed resistance.

In FIGS. 9 and 10 I show modifications in my second embodiment which adapt my device to the muscle strength positions in a bench press exercise movement. Referring to FIG. 9, the numeral 120 designates a guide block with a contoured upper face 122. The guide block 120 is secured to the upper surface 114 of the lever arm 100 in the area of travel of the roller 110 by attachment bolts 124. As the roller 110 moves away from the pivot point of the lever arm 100 it is caused first to travel upwardly at a more rapid rate than would normally occur when it travels on the flat upper surface 114 of the lever arm. Then the roller passes into a back-off point on the contoured surface where the upward travel is virtually halted, and, finally, the roller commences further upward travel ar an accelerated rate as it moves outward over the last portion of the guide block 120.

In FIG. 10 I accomplish a similar result using a contoured roller 126 and a rack gear 128. The rack gear 128 is secured to the upper surface 114 of the lever arm 100 by attachment bolts 130. The contoured roller 126 has peripheral teeth 132 which engage the rack gear 128 and prevent any skidding of the roller during movement along the lever arm. The contour roller 126 is interchangeable with rollers of other contours.

With either of these modifications it will be understood that by changing the guide block 120 or the contoured roller 126 I can adapt my device to provide nearly any desired variation of resistance in an exercise cycle.

In utilizing these modifications it should be understood that the variations of resistance experienced by the user are as much and possibly more, the result of changes in the manner that the forces are vectored as they are the result of changes in the lever arm length. Changes in the force vectoring occur by reason of the different angle of incidence between the roller 110 and the lever arm 100 due to the contoured surface 122 on the guide block 120, or between the contoured roller 126 and the rack gear 128 (see FIGS. 9 and 10).

Because of the simplicity of structure by which my invention accomplishes the desired variation in resistance, there are numerous other modifications which could be easily incorporated. The pivot point of the lever arm could be made movable with respect to the frame to modify the manner in which the mechanical advantage is changed during exercise movement, and a suitable mechanism could be employed to vary the lever arm length during an exercise movement by moving the lever arm with respect to the pivot point rather than with respect to the point at which the weights are connected.

Also, of course, resistance may be provided by means other than weights, and still be made fully compatible with my device.

From this description it should be understood that I have provided an exercise device fully capable of attaining the objects and providing the advantages heretofore granted it. It should also be understood that the variable resistance provided by my device is adaptable to my different types of exercise devices. By arranging the change of lever advantage to provide greater resistance at those my in the exercise cycle where the user has the greatest available strength, maximum muscle development can be achieved with my device.

Finally, it will be understood that my exercise device can be inexpensively made, and even combined into existing equipment, and is simple to use.

I claim:

[1. An exercise device comprising:

a frame;

a lever arm pivotally mounted in said frame at a lever arm pivot and pivotally movable by a user through an exercise cycle;

user contact means interconnected with said lever arm for applying pivotal movement force thereto;

resistance means interconnected with said frame; and an interconnection mechanism interconnecting said resistance means to said lever arm at a lever arm connecting point disposed in spaced relationship with said lever arm pivot, said interconnection mechanism having movement means movable in response to pivotal movement of said lever arm to vary the spaced relationship between said lever arm connecting point and said lever arm pivot, and guide means interconnected with said frame and disposed to direct the path of movement of said movement means.]

[2. An exercise device as described in claim 1, in which:

said interconnection mechanism movement means includes a yoke connected to said resistance means and disposed about a portion of said lever arm, and a yoke roller interconnected with said yoke and disposed to travel longitudinally along said lever arm during pivotal movement thereof.]

3. An exercise device [as described in claim 2, in which] *comprising*:

*a frame;*

*a lever arm pivotally mounted in said frame at a lever arm pivot and pivotally movable by a user through an exercise cycle;*

*user contact means interconnected with said lever arm for applying pivotal movement force thereto;*

*resistance means interconnected with said frame; and an interconnection mechanism interconnecting said resistance means to said lever arm at a lever arm connecting point disposed in spaced relation with said lever arm pivot, said interconnection mechanism having movement means movable in response to pivotal movement of said lever arm to vary the spaced relationship between said lever arm connecting point and said lever arm pivot;*

*wherein said interconnection mechanism movement means includes a yoke connected to said resistance means and disposed about a portion of said lever arm, and a yoke roller interconnected with said yoke and disposed to travel longitudinally along said lever arm during pivotal movement thereof;*

*guide means interconnected with said frame and disposed to direct the path of movement of said movement means; and wherein* said lever arm has a non-linear contoured surface path; and said roller of said interconnection mechanism travels along said path on said lever arm.

4. An exercise device [as described in claim 2 in which] *comprising*:

*a frame;*

*a lever arm pivotally mounted in said frame at a lever arm pivot and pivotally movable by a user through an exercise cycle;*

*user contact means interconnected with said lever arm for applying pivotal movement force thereto;*

*resistance means interconnected with said frame; and an interconnection mechanism interconnecting said resistance means to said lever arm at a lever arm connecting point disposed in spaced relation with said lever arm pivot, said interconnection mechanism having movement means movable in response to pivotal movement of said lever arm to vary the spaced relationship between said lever arm connecting point and said lever arm pivot;*

*wherein said interconnection mechanism movement means includes a yoke connected to said resistance means and disposed about a portion of said lever arm, and a yoke roller interconnected with said yoke and disposed to travel longitudinally along said lever arm during pivotal movement thereof;*

*guide means interconnected with said frame and disposed to direct the path of movement of said movement means; and wherein* said roller of said interconnection mechanism has a non-circular contoured periphery with gear teeth and said lever arm has a substantially linear rack gear engageable by said roller teeth.

5. An exercise device [as described in claim 1, in which] *comprising* :

*a frame;*

*a lever arm pivotally mounted in said frame at a lever arm pivot and pivotally movable by a user through an exercise cycle;*

*user contact means interconnected with said lever arm at a location remote from and in fixed relationship to the lever arm pivot for applying pivotal movement force thereto;*

*resistance means interconnected with said frame; and an interconnection mechanism interconnecting said resistance means to said lever arm at a lever arm connecting point disposed in spaced relationship with said lever arm pivot, said interconnection mechanism having movement means movable in response to pivotal movement of said lever arm to vary the spaced relationship between said lever arm connecting point and said lever arm pivot, and guide means interconnected with said frame and disposed to direct the path of movement of said movement means;* said interconnection mechanism guide means [define] *defining* a substantially linear path disposed in intersecting relationship with the longitudinal axis of said lever arm at all positions of said lever arm during its pivotal movement through said exercise cycle, and engageable by said movement means to guide said lever arm connecting point along a predetermined path during movement of said lever arm.

6. An exercise device as described in claim 5, in which:

said guide means of said interconnection mechanism includes a pair of upstanding rods mounted in said frame, one on each side of said lever arm and a pair of alignment rollers interconnected with said movement means of said interconnection mechanism and disposed to travel along said rods.

7. An exercise device [as described in claim 5, in which] *comprising*:

*a frame;*

*a lever arm pivotally mounted in said frame at a lever arm pivot and pivotally movable by a user through an exercise cycle;*

*user contact means interconnected with said lever arm for applying pivotal movement force thereto;*

*resistance means interconnected with said frame; and an interconnection mechanism interconnecting said resistance means to said lever arm at a lever arm connecting point disposed in spaced relationship with said lever arm pivot, said interconnection mechanism having movement means movable in response to pivotal movement of said lever arm to vary the spaced relationship between said lever arm connecting point and said lever arm pivot, and guide means interconnected with said frame and disposed to direct the path of movement of said movement means;*

*said interconnection mechanism guide means defining a substantially linear path disposed in intersecting relationship with the longitudinal axis of said lever arm at all positions of said lever arm during its pivotal movement through said exercise cycle, and engageable by said movement means to guide said lever arm connecting point along a predetermined path during movement of said lever arm; and wherein* said guide means of said interconnection mechanism includes a guide arm having a proximal end pivotally mounted to said frame in spaced relationship with said lever arm pivot and a distal end interconnected with said movement means of said interconnection mechanism.

8. An exercise device [as described in claim 1, in which:] *comprising a frame;*

*a lever arm pivotally mounted in said frame at a lever arm pivot and pivotally movable by a user through an exercise cycle;*

*user contact means interconnected with said lever arm at a location remote from and in fixed relationship relative to the lever arm pivot for applying pivotal movement force thereto;*

*resistance means interconnected with said frame; and an interconnection mechanism interconnecting said resistance means to said lever arm at a lever arm connecting point disposed in spaced relationship with said lever arm pivot, said interconnection mechanism having movement means movable in response to pivotal movement of said lever arm to vary the spaced relationship between said lever arm connecting point and said lever arm pivot, and guide means interconnected with said frame and disposed to direct the path of movement of said movement means;* said interconnection mechanism movement means [includes] *including* roller means interconnected with said resistance means and disposed to move longitudinally with respect to said lever arm upon pivotal movement of said lever arm to vary the spaced relationship between said lever arm connecting point and said lever arm pivot; and said interconnection mechanism guide means [includes] *including* a rigid member interconnected with said frame and said roller means and disposed to guide said roller means along a predetermined path during movement of said lever arm through said exercise cycle.

9. An exercise device comprising:

a frame;

resistance means mounted to said frame;

a lever arm mounted in said frame *and movable about a pivot axis fixed relative to the lever arm and the frame*;

user contact means interconnected with said lever arm and disposed to move said lever arm in said frame;

coupling means interconnecting said resistance means and said lever arm, said coupling means includes movement means movable in response to movement of said lever arm to vary the point of interconnection between said resistance means and said lever arm; and guide means interconnected with said frame and disposed to engage and guide the movement of said coupling means along a path adapted to vary the manner in which said resistance of said resistance means is levered and vectored to resist movement of said lever arm.

10. An exercise device as described in claim 9 in which:

said resistance means includes a stack of weights mounted in said frame and vertically movable with respect thereto; and said coupling means includes a vertically disposed rod having a lower end interconnected with said weights and having a roller mounted on the upper end thereof, said roller being disposed to travel longitudinally along said lever arm as said lever arm *is moved* with respect to said frame.

11. An exercise device as described in claim 10 in which:

said lever arm is pivotally mounted in said frame; and said user contact means is disposed to permit pivotal movement of said lever arm.

12. An exercise device as described in claim 11, in which:

said guide means includes a rigid member defining a substantially linear path disposed for engagement by said coupling means to vary the distance between said lever arm pivot point and the point of interconnection between said resistance means and said lever arm during movement of said lever arm with respect to said frame.

*13. An exercise device comprising:*

*a frame;*

*a lever arm pivotally mounted in the frame at a lever arm pivot and pivotally movable by a user through an exercise cycle;*

*user contact means attached to an end of the lever arm remote from and in fixed relationship relative to the pivot for applying a pivotal movement force to the lever arm during an exercise cycle;*

*resistance means interconnected with the frame;*

*and an interconnection mechanism interconnecting the resistance means to the lever arm at a lever arm connecting point located in spaced relationship with the lever arm pivot, the interconnection mechanism having movement means movable in response to pivotal movement of the lever arm to vary the spacing along the lever arm between the lever arm connecting point and the pivot, and guide means interconnected with the frame and disposed to direct the path of movement of the movement means.*

*14. An exercise device comprising a frame;*

*a lever arm pivotally mounted in the frame for pivotal motion about a pivot axis on the frame during an exercise cycle, the lever arm including user contact means at a point remote from and in fixed relationship relative to the pivot axis;*

*resistance means attached to the frame;*

*and an interconnection mechanism connected with the resistance means and the lever arm for applying a force generated by the resistance means to the lever arm at a lever arm force applying point intermediate the user contact means and the pivot axis;*

*movement means inducing relative movement between the mechanism and the lever arm over a portion of the length of the latter when the lever arm is pivoted through an exercise cycle to vary the point of interconnection between the resistance means and the lever arm, so that during an exercise cycle the effective moment arms of the resistance means and the user contact means about the pivot axis vary during an exercise cycle;*

*and guide means interconnected with the frame and disposed to direct the path of movement of the movement means; whereby the force that must be applied by a user to the user contact means to move the lever arm in opposition to the resistance means varies over the course of the exercise cycle.*

*15. An exercise device comprising a frame;*

*a lever arm mounted in the frame for movement about a pivot axis fixed relative to the frame and the lever arm, the lever arm including handle means spaced from the pivot axis for applying a force to the lever arm for pivotally moving the lever arm about the axis through an exercise cycle;*

*resistance means connected to the frame;*

*and an interconnection mechanism interconnecting the resistance means with the lever arm at an interconnec-*

*tion point spaced from the pivot axis, the interconnection mechanism including movement means movable in response to a pivotal movement of the lever arm to vary the point of interconnection between the resistance means and the lever arm along the length of the lever arm and guide means interconnected with the frame to define the path of movement of the movement means so that during a portion of the exercise cycle the interconnection point moves closer to the handle means as the lever arm pivots about the axis during a first portion of an exercise cycle and moves farther away from the handle means as the lever arm pivots about the axis during a second portion of the exercise cycle; whereby, during an exercise cycle, the user is subjected to decreasing and incrasing mechanical advantages and a corresponding increase and decrease in the resistance from the resistance means at the handle means during portions of the exercise cycle.*

*16. A device according to claim 15 wherein the force applying means is disposed intermediate the pivot axis and the handle means so that mechanical advantage decreases and the resistance from the resistance means at the handle means increases during the first portion of the exercise cycle.*

*17. An exercise device comprising:*

*a frame,*

*means defining a pivot in the frame, upright post means mounted to the frame and horizontally spaced from the pivot;*

*a lever arm having a first end attached to the pivot for pivotal motion relative to the frame about an axis of the pivot, the pivot axis being fixed relative to the frame and the lever arm, the lever arm further comprising a second end spaced from the pivot and defining handle means, the handle means being disposed on the side of the post means opposite from the pivot axis;*

*a weight interconnected with the post means for movement therealong;*

*a mechanism connected with the weight and engaging the lever arm at an interconnecting point located intermediate the handle means and the pivot axis where a load generated by the weight is applied to the lever arm, the mechanism including movement means movable relative to the lever arm along a portion of the length thereof to vary the interconnecting point between the weight and the lever arm and to thereby move the load relative to the lever arm along a portion of the length thereof in response to a pivotal motion of the lever arm;*

*and means interconnected with the frame for guiding the mechanism along the post means; whereby the application of a force to the handle means to pivot the lever arm about the pivot axis in opposition to the load from a first position to a second position causes a relative movement of the mechanism along the lever arm and moves the load along the lever arm closer to the handle means so that the force that must be applied to the handle means to overcome the load must be correspondingly increased.*

*18. A device according to claim 17 wherein the mechanism includes low friction means engaging the post means for movement therealong.*

*19. A device according to claim 17 wherein the mechanism includes a roller engaging the lever arm at the force applying point and movable along the lever arm when it is pivoted about the pivot axis.*

*20. A device according to claim 17 including a plurality of independent weights movable along the post means, and including means for varying the number of weights connected to the mechanism.*

*21. An exercise device comprising:*

*a frame defining a base, upright post means and a pivot shaft having a substantially horizontal pivot axis attached to the frame and horizontally spaced from the post means;*

*a lever arm mounted in the frame and engaging the pivot for pivotal movement about the pivot axis, the lever arm being fixed against longitudinal movement with respect to the pivot axis, the lever arm extending in a direction transverse to the post means from the axis past the post means and terminating in handle means disposed on a side of the post means opposite the pivot axis;*

*a weight movable along the post means;*

*a mechanism for connecting the weight to the lever arm and including means movably mounting the mechanism for movement relative to the frame parallel to the post means, the mechanism including movement means engaging the lever arm and applying the weight to the lever arm at a point located intermediate the pivot axis and the handle means, the movement means including means permitting relative motion between the lever arm and the mechanism for shifting the location of the point along the lever arm when the lever arm pivots about the axis;*

*and guide means interconnected with the frame and disposed to direct the path of movement of the mechanism;*

*so that a user can pivot the handle means and the lever arm about the pivot axis between a first position and a second position during an exercising cycle by applying a corresponding exercise force to the handle means, the pivotal movement of the lever arm resulting in an increase of the exercise force during one portion of the exercising cycle and a corresponding decrease of the exercise force during a second portion of the exercising cycle to move the weight along the post means.*

*22. An exercise device comprising:*

*a frame;*

*a lever arm pivotally movably mounted in said frame at a lever arm pivot, which is fixed relative to the frame and lever arm, for movement of the lever arm by a user through an exercise cycle;*

*user contact means interconnected with said lever arm for applying pivotal movement force thereto;*

*resistance means interconnected with said frame; and an interconnection mechanism interconnecting said resistance means to said lever arm at a lever arm connecting point disposed in spaced relation with said lever arm pivot, said interconnection mechanism having movement means movable in response to pivotal movement of said lever arm to vary the spaced relationship between said lever arm connecting point and said lever arm pivot;*

*wherein said interconnection mechanism movement means includes a yoke connected to said resistance means and disposed about a portion of said lever arm, and a yoke roller interconnected with said yoke and disposed to travel longitudinally along said lever arm during pivotal movement thereof;*

*and guide means interconnected with said frame and disposed to direct the path of movement of said movement means.*

*23. An exercise device comprising:*

*a frame;*

*a lever arm pivotally mounted in said frame at a lever arm pivot and pivotally movable about the pivot by a user through an exercise cycle, the lever arm being fixed against longitudinal movement with respect to the pivot;*

*user contact means interconnected with said lever arm for applying pivotal movement force thereto;*

*resistance means interconnected with said frame, and an interconnection mechanism interconnecting said resistance means to said lever arm at a lever arm connecting point disposed in spaced relationship with said lever arm pivot, said interconnection mechansim having movement means movable in response to pivotal movement of said lever arm to vary the spaced relationship between said lever arm connecting point and said lever arm pivot to correspondingly vary the point of interconnection between said resistance means and said lever arm, and guide means interconnected with said frame and disposed to direct the path of movement of said movement means.*

* * * * *